United States Patent
Willer

[19]

[11] Patent Number: 6,082,516
[45] Date of Patent: Jul. 4, 2000

[54] VARIABLE HEIGHT ADJUSTABLE PUNCH ASSEMBLY HAVING QUICK RELEASE STRIPPER PLATE

[75] Inventor: Robert E. Willer, Grand Island, N.Y.

[73] Assignee: Amada Engineering & Service Co., Inc., La Mirada, Calif.

[21] Appl. No.: 09/010,575

[22] Filed: Jan. 22, 1998

[51] Int. Cl.$^7$ .................................................. F16D 3/34
[52] U.S. Cl. .......................................... 192/223.2; 192/44
[58] Field of Search ................ 192/223.2, 215, 192/38, 44, 45, 47, 89.21

[56] References Cited

U.S. PATENT DOCUMENTS

| | | |
|---|---|---|
| 583,908 | 6/1897 | Kenyon . |
| 1,334,389 | 3/1920 | Murray . |
| 1,383,414 | 7/1921 | Mansell . |
| 1,386,259 | 8/1921 | Jourdan et al. . |
| 1,793,259 | 2/1931 | Smeuninx . |
| 2,491,128 | 12/1949 | Nelson . |
| 2,618,940 | 11/1952 | Wyzenbeek . |
| 2,670,824 | 3/1954 | Banker ................................ 192/223.2 |
| 2,719,722 | 10/1955 | Nickless . |
| 2,914,153 | 11/1959 | Krause et al. ....................... 192/223.2 |
| 3,007,253 | 11/1961 | Smeets . |
| 3,037,404 | 6/1962 | Burg . |
| 3,084,774 | 4/1963 | Liang ....................................... 192/44 |
| 3,195,386 | 7/1965 | Daniels . |
| 3,377,887 | 4/1968 | Nelson et al. . |
| 3,521,911 | 7/1970 | Hanes et al. . |
| 3,548,700 | 12/1970 | Herzog et al. . |
| 3,586,143 | 6/1971 | Hutchinson .............................. 192/44 |
| 3,595,113 | 7/1971 | Herzog et al. . |
| 3,633,931 | 1/1972 | Bilz . |
| 3,658,351 | 4/1972 | Benjamin et al. . |
| 3,720,417 | 3/1973 | Smith . |
| 3,735,993 | 5/1973 | Seibert . |

(List continued on next page.)

FOREIGN PATENT DOCUMENTS

| | | |
|---|---|---|
| 3241 825 C2 | 5/1984 | Germany . |
| 42 03 158 A1 | 8/1993 | Germany . |
| 6-99302 | 4/1994 | Japan . |
| 195901 | 4/1923 | United Kingdom . |
| 2 137 122 | 10/1984 | United Kingdom . |

*Primary Examiner*—Charles A. Marmor
*Assistant Examiner*—Scott Lund
*Attorney, Agent, or Firm*—Blank Rome Comisky & McCauley LLP

[57] ABSTRACT

A punch assembly having infinite adjustment of the punch tool and quick release of the stripper plate. A punch assembly has a clutch mechanism that secures the central punch body after a depth adjustment has been made. The clutch includes two ball bearings with an expansion spring separating the two ball bearings. The spring forces the ball bearings outwardly thus engaging the central body of the punch and the inside wall of the outer casing. This arrangement effectively locks the punch from rotation in either direction. A set of locking cams, disposed directly opposite each other and including a surface with which one may apply an inward force and a set of fingers that have a sloped face that forces the ball bearings toward each other are operated to release the central body from its locked position. This results in infinite, rather than incremental, adjustment of the depth of the punch. As a consequence, when the punch tool is sharpened and its length dimension reduced, the height of the punch tool can be readily adjusted to account for the change in the length dimension of the punch tool. A quick release mechanism for a stripper plate assembly includes a locking ring having three arcuate grooves having radially increasing dimension and three locking clips which are circumferentially fixed relative to the locking ring. The locking clips engage the stripper plate. Upon rotation of the locking ring, the locking clips ride in the arcuate grooves which act as camming surfaces and open the locking clips, thereby releasing the stripper plate. As a result, a quick release is effected, with only the stripper plate itself being released. The mechanism otherwise remains assembled for insertion of a new stripper plate.

9 Claims, 4 Drawing Sheets

U.S. PATENT DOCUMENTS

| | | |
|---|---|---|
| 3,829,816 | 8/1974 | Barry et al. . |
| 3,947,047 | 3/1976 | Hultman . |
| 4,092,888 | 6/1978 | Wilson . |
| 4,165,669 | 8/1979 | Brown et al. . |
| 4,171,821 | 10/1979 | Miller . |
| 4,248,111 | 2/1981 | Wilson et al. . |
| 4,309,042 | 1/1982 | Fauth et al. . |
| 4,375,774 | 3/1983 | Wilson et al. . |
| 4,395,051 | 7/1983 | Yonomura . |
| 4,446,767 | 5/1984 | Wilson . |
| 4,577,875 | 3/1986 | Miyakawa . |
| 4,708,548 | 11/1987 | Taylor et al. . |
| 4,777,714 | 10/1988 | Blessing . |
| 4,850,755 | 7/1989 | Spencer . |
| 4,855,558 | 8/1989 | Ramsbro . |
| 4,989,484 | 2/1991 | Johnson et al. . |
| 5,037,254 | 8/1991 | Asberg . |
| 5,042,352 | 8/1991 | Lux . |
| 5,056,392 | 10/1991 | Johnson et al. . |
| 5,081,891 | 1/1992 | Johnson et al. . |
| 5,127,293 | 7/1992 | Chathman . |
| 5,131,303 | 7/1992 | Wilson et al. . |
| 5,146,832 | 9/1992 | Wilson et al. . |
| 5,157,873 | 10/1992 | Rudolf et al. . |
| 5,199,831 | 4/1993 | Broucksou ............................ 192/44 X |
| 5,271,303 | 12/1993 | Chatham . |
| 5,301,580 | 4/1994 | Rosene et al. . |
| 5,316,323 | 5/1994 | Jovanovic . |
| 5,329,835 | 7/1994 | Timp et al. . |
| 5,398,946 | 3/1995 | Quiring . |
| 5,460,253 | 10/1995 | Ritter et al. ........................... 192/223.2 |
| 5,647,256 | 7/1997 | Schneider . |

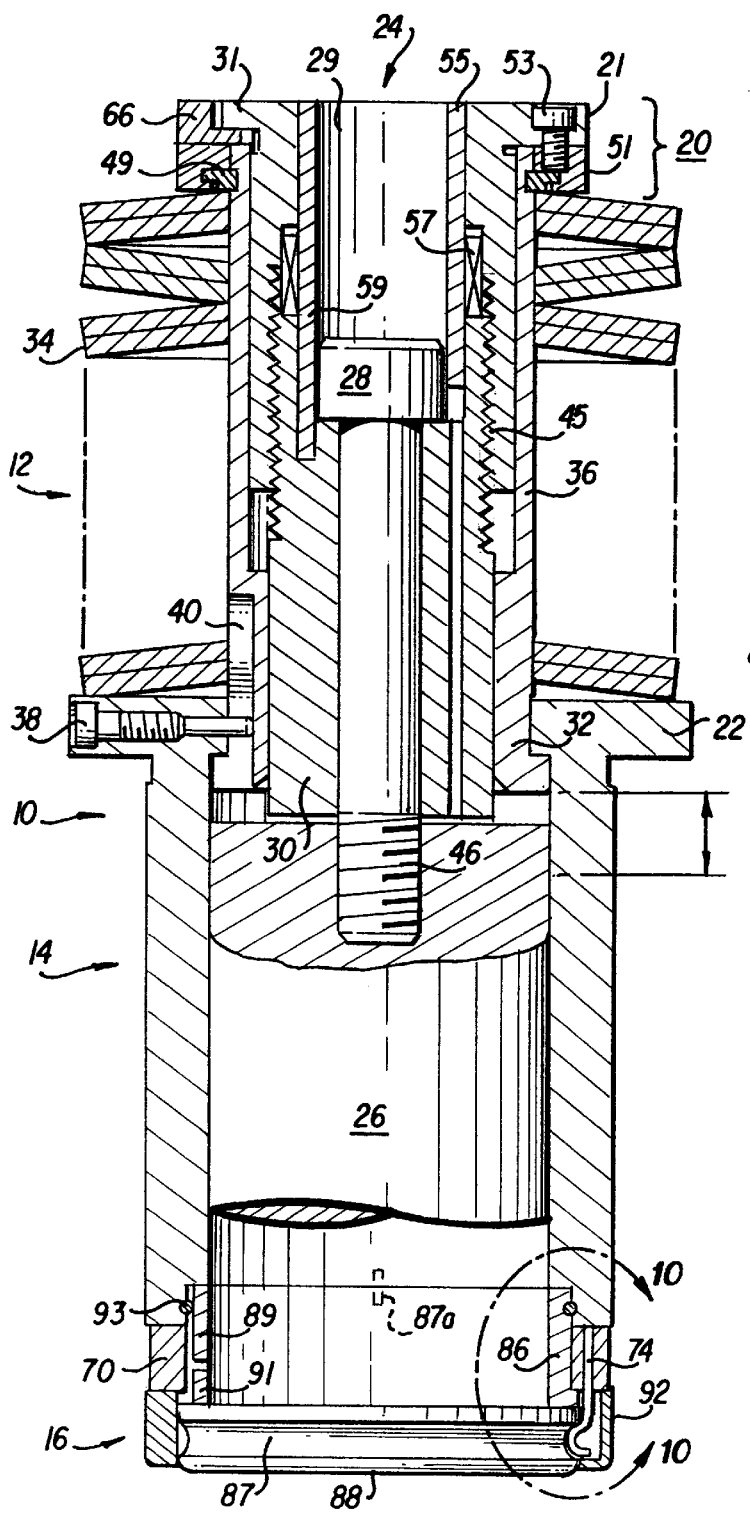
FIG. 3
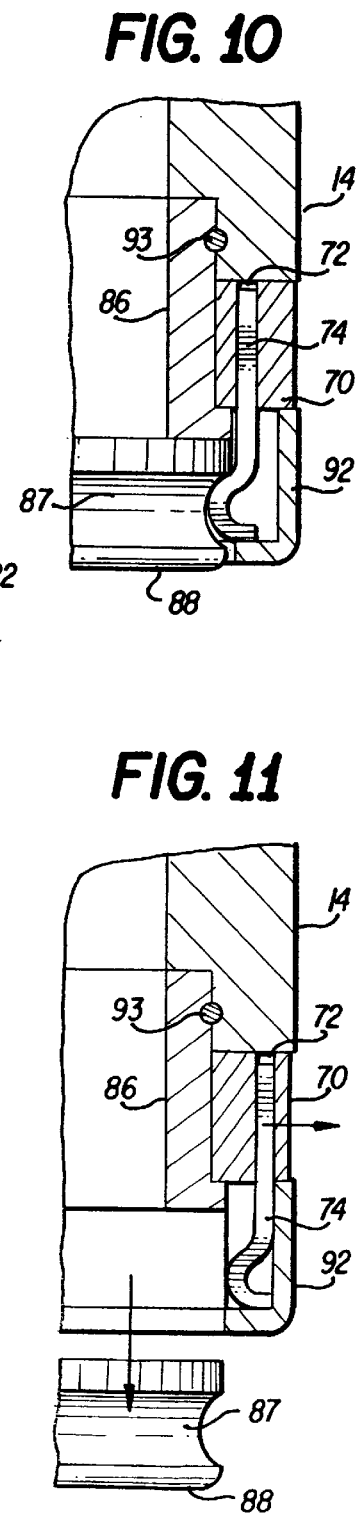
FIG. 10
FIG. 11

VARIABLE HEIGHT ADJUSTABLE PUNCH ASSEMBLY HAVING QUICK RELEASE STRIPPER PLATE

FIELD OF THE INVENTION

The present invention relates generally to punch head assemblies having adjustable punch heights and releasable stripper plates, and more particularly to punch head assemblies having an infinitely adjustable punch height and a quick release stripper plate mechanism.

BACKGROUND OF THE INVENTION

Punch head assemblies for use in turret punch presses must be periodically reconfigured for a variety of reasons. When the punch tool becomes dull, it must be sharpened. However, such sharpening reduces the height of the punch tool. As a consequence, the punch tool height must be adjusted. Moreover, periodically, a replacement tool is substituted for the punch tool. This requires the changing of the stripper plate for one having a different hole configuration which will match the hole shape of the replacement tool.

Various attempts have been made in the prior art to provide for punch tool height adjustment. Chief among these prior art patents are U.S. Pat. Nos. 5,329,835, 4,375,774, and 5,131,303. U.S. Pat. No. 5,329,835 to Timp et al is directed to incremental adjustment of the punch within the punch housing using a plurality of detents and detent stops. The punch is rotatable in 15° increments resulting in 0.004 inch punch depth adjustment increments. U.S. Pat. No. 4,375,774 to Wilson et al is directed to an adjustable depth punch tip which is keyed by two key pathways 90° apart from each other and operatively interacting with a key affixed to the punch driver. U.S. Pat. No. 5,131,303 to Wilson et al is directed to an adjustable punch assembly in which a wire clip engages equiangular detents for incremental adjustment of the punch tip relative to the punch assembly.

In addition, various prior art components have been provided to permit adjustment between components. U.S. Pat. No. 583,908 to Kenyon discloses a nut lock comprising two ball bearings, biased together between two springs. In the normal position, the ball bearings are directly over the axis of the nut and engage the threads, thus locking the nut from rotation. By inserting a pin through a hole in the nut, the ball bearings are pushed apart and disengaged from the thread, allowing rotation of the nut or threaded portion. U.S. Pat. No. 3,829,816 to Barry et al shows a one-way clutch which is used in connecting drill pipe sections. The clutch is made up of a single roller biased by a spring and a cam surface. U.S. Pat. No. 1,386,259 to Jourdan et al is directed to a nut fastener in which a ball is interposed between the nut and bolt in a cavity formed between the nut and bolt. U.S. Pat. No. 1,383,414 to Mansell shows a locking nut with a channel in which a plunger having a locking disk is mounted. U.S. Pat. No. 1,334,389 to Murray shows a self-locking nut having an eccentric recess in which a roller is spring-biased so as to engage the bolt. A tool is required to displace the roller against the spring so as to disengage the lock nut from the bolt. U.S. Pat. No. 5,146,832 to Wilson et al shows deformable tabs for holding a punch tip in place.

With respect to stripper plates, the prior art contemplates various release mechanisms. U.S. Pat. No. 4,248,111 to Wilson et al shows a stripper plate release mechanism in which clip tabs having holding tabs engage a groove in the stripper plate. A separate fork-shaped tool slides into a groove and forces the clip tabs outwardly, thereby disengaging the holding tabs. U.S. Pat. No. 5,301,580 to Rosene et al discloses a locking ring stripper plate assembly comprising a rotatable stripper plate cap which can be manually rotated with respect to a guide sleeve. The stripper plate is released by rotating a cap to loosen a split end retaining wire. A spring-loaded locking button locks the rotatable stripper cap in position. U.S. Pat. No. 3,521,911 to Hanes et al shows an expandable split latch ring mounted on one pipe section and received in a groove in an adjacent pipe section, with the latch ring engaged and disengaged using a malleable lock. U.S. Pat. No. 5,127,293 to Chatham shows a stripper plate which is held in place by a retaining ring which has locator slots and retaining projections and hence is keyed for released and locked operation. U.S. Pat. No. 4,446,767 to Wilson shows a stripper plate held in place by a split locking ring. U.S. Pat. No. 4,092,888 to Wilson shows a stripper plate held in place by a resilient retaining ring. U.S. Pat. Nos. 4,989,484, 5,056,392 and 5,081,891 to Johnson et al, each show a quick release mechanism for a stripper plate in which a spring-biased locking ring rotates to engage or disengage pins on the stripper plate which has pin receiving slots. U.S. Pat. No. 2,491,128 to Nelson shows a buffer employing a wedge block to expand a split ring.

All of the prior art references have the limitation that incremental adjustment (rather than infinite adjustment) of the punch tool height is achieved. Moreover, none of the prior art references permits a quick release of the stripper plate without major disassembly of the punch tool assembly. The present invention addresses these disadvantages.

SUMMARY OF THE INVENTION

The present invention is directed to a punch assembly having an infinitely adjustable punch tool height adjustment. The punch tool is attached to a male adjuster member which is threadably engaged with a female adjuster which can be engaged with an assembly housing or disengaged from the assembly housing to permit rotation of the female adjuster relative to the assembly housing. The female adjuster is subject to only circumferential rotation and does not move vertically with respect to the assembly housing. The inclined surfaces of the threads which engage with the male adjuster permit vertical movement of the male adjuster as a result of rotational motion of the female adjuster. Thus the height of the punch tool is subject to infinite adjustment over the stroke permitted by the inclined threaded surface between the male and female adjusters. The female adjuster engages and disengages from the assembly housing by use of a clutch mechanism. The clutch includes two ball bearings with an expansion spring separating the two ball bearings. The spring forces the ball bearings outwardly thus engaging the outer wall of the female adjuster and the inside wall of the assembly housing. This arrangement effectively locks the punch from rotation in either direction. A set of locking cams, disposed directly opposite each other and including a surface with which one may apply an inward force and a set of fingers that have a sloped face that forces the ball bearings toward each other are operated to release the female adjuster from its locked position. This results in infinite, rather than incremental, adjustment of the height of the punch. As a consequence, when the punch tool is sharpened and its length dimension reduced, the height of the punch tool can be readily adjusted to account for the change in the length dimension of the punch tool.

A quick release mechanism for a stripper plate assembly includes a locking ring having three arcuate grooves having radially increasing dimension and three locking clips which are circumferentially fixed relative to the locking ring. The locking clips engage the stripper plate. Upon rotation of the locking ring, the locking clips ride in the arcuate grooves which act as camming surfaces and open the locking clips, thereby releasing the stripper plate. As a result, a quick release is effected, with only the stripper plate itself being released. The mechanism otherwise remains assembled for insertion of a new stripper plate.

BRIEF DESCRIPTION OF THE DRAWINGS

FIG. 3 is a sectional view taken along line 3—3 of FIG. 2 of a punch head assembly in accordance with the present invention;

FIG. 10 is an enlarged detail view of the release mechanism for the quick release stripper plate taken along detail line 10—10 of FIG. 3; and FIG. 11 is an enlarged detail view of the release mechanism of FIG. 10 showing the stripper plate being released.

DETAILED DESCRIPTION OF THE INVENTION

Figure 1:
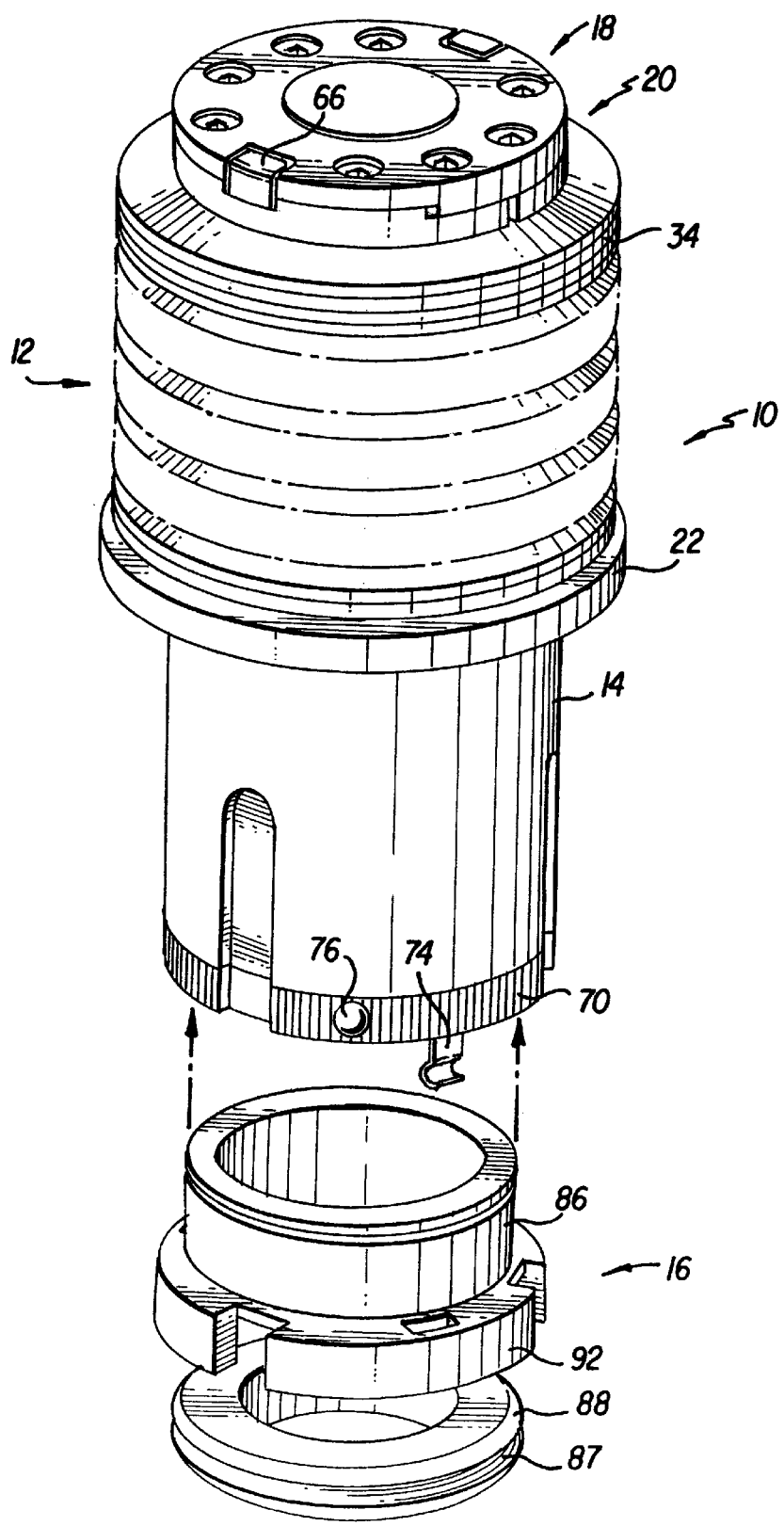
FIG. 1 is a partially exploded perspective view of a punch head assembly showing release of a quick release stripper plate assembly.
Figure 2:
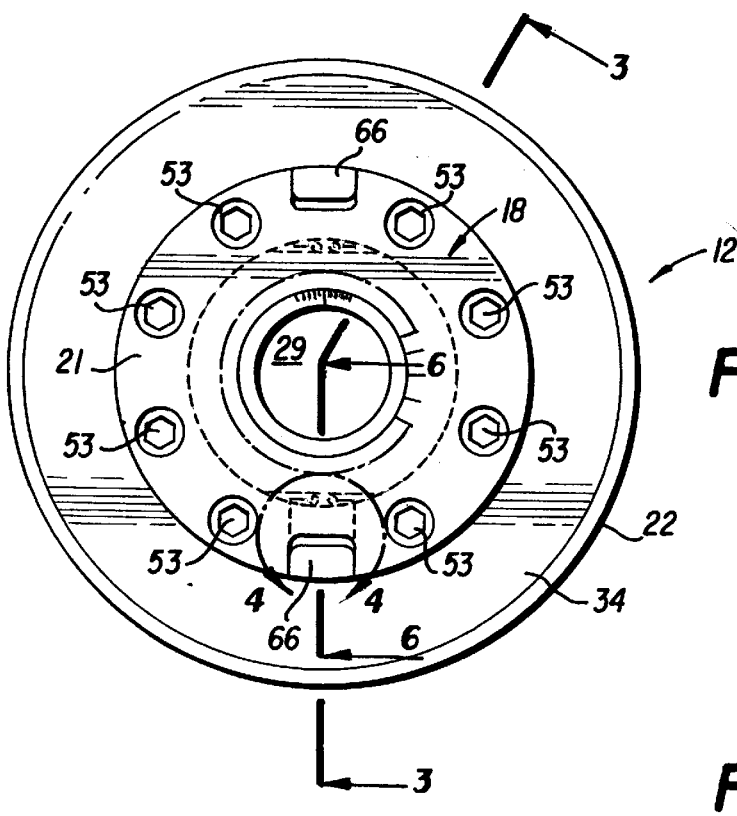
FIG. 2 is a top plan view of a punch head assembly in accordance with the present invention.

Referring now to the drawings, wherein like elements are designated by like numerals, FIG. 1 is a perspective view of a punch head assembly 10 having an upper head assembly 12 and a lower punch guide housing 14 to which is releasably attached a stripper plate quick release mechanism 16. FIG. 2 is a top plan view showing a clutch actuation assembly 18 and upper spring support 20, disc or bellows spring 34 and lower spring support 22 of the upper head assembly 12. FIG. 3 is a sectional view taken along line 3—3 of FIG. 2 which shows the inner workings of an incremental punch height adjustment 24 and the stripper plate quick release mechanism 16.

As shown in FIG. 3, the punch head assembly is comprised of an upper head assembly 12, a lower punch guide housing 14 and a stripper plate quick release mechanism 16. A punch tool 26 is attached by bolt 28 to upper head assembly 12. Upper head assembly 12 has upper head flange 20 and lower flange 32. Punch guide housing 14 has upper housing flange 22. Disc or bellows spring 34 is disposed between upper head flange 20 and upper housing flange 22 for maintaining upper head assembly 12 biased in a stationary unactuated position.

Upper head assembly 12 includes an outer housing 36 which is movable in a vertical direction only, in response to being struck by a striker or ram (not shown). Housing 36 is keyed by a guide screw 38 engaging groove 40 to prevent circumferential movement. Punch tool 26 is bolted to male adjuster 30 which has threads 45 which engage with female adjuster 31. female adjuster 31 is held in place by thrust ring 49 which is circumferentially engaged by retainer pair 51 which is bolted to female adjuster 31 by head screws 53. An indicator collar 55 is held within cavity 29 of female adjuster 31 by spring 57 and fixed by guide dowel 59 to male adjuster 30. Disc or bellows spring 34 is held in place by upper head flange 20 formed by bolt flange 21, retainer pair 51 and thrust ring 49 and by flange 22 of punch guide housing 14. A pair of release trigger buttons 66 are oppesedly mounted to engage female adjuster 31. Each release trigger button 66 engages a clutch mechanism 44 which permits female adjuster 31 to rotatably engage and disengage with housing 36 (FIG. 4).

Figure 4:
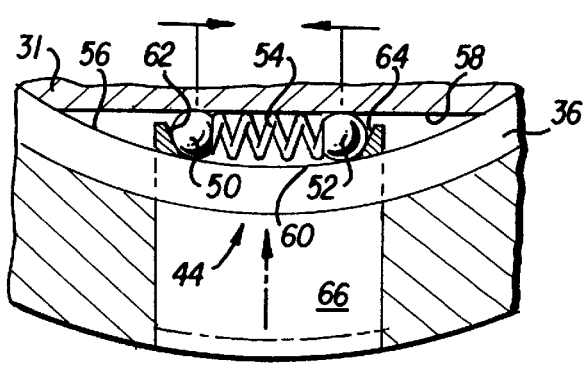
FIG. 4 is a sectional detail view of a clutch assembly in an engaged configuration taken along line 4—4 of FIG. 2.
Figure 5:
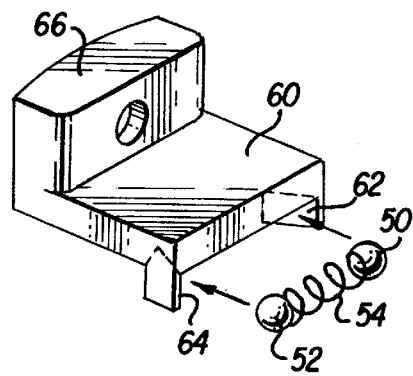
FIG. 5 is an exploded view of the clutch assembly of FIG. 4 showing the clutch balls, spring and trigger button.
Figure 6:
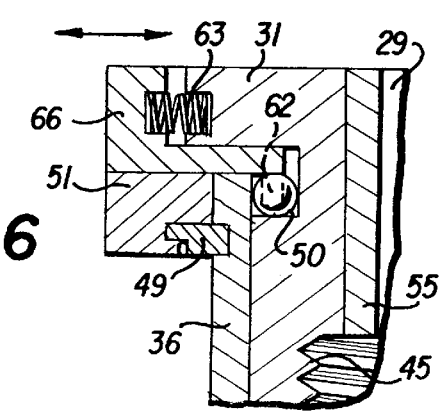
FIG. 6, is an enlarged partial fragmentary sectional view of the clutch mechanism taken along line 6—6 of FIG. 2.

Clutch mechanism 44 is shown in FIGS. 4–6. The clutch mechanism 44 is made up of two ball bearings 50, 52 biased apart by spring 54. The ball bearings 50, 52 and spring 54 are held between an inner arcuate surface 56 of housing 36 and a flat section surface 58 of female adjuster 31. A wedging yoke 60 having two wedging surfaces 62, 64 engages the ball bearings 50, 52, as shown in the exploded view of FIG. 5. The assembled clutch mechanism 44 is shown mounted relative to female adjuster 31, housing 36, retainer pair 51 and thrust ring 49 in FIG. 6. Spring 63 biases trigger button 66 away from female adjuster 31. Thus, as shown in FIG. 4, when the trigger button 66 is so biased, the two ball bearings are held forced in place by spring 54 and contact surfaces 56 and 58. This prevents rotation of female adjuster 31 relative to housing 36. When trigger button 66 is depressed, compressing spring 63, wedging surfaces 62, 64 push the two ball bearings 50, 52 towards each other compressing spring 54. This disengages ball bearings 50, 52 from contact with housing surface 56 and permits female adjuster 31 to rotate relative to housing 36. Because female adjuster 31 is retained on housing 36 by retainer pair 51, only rotational (circumferential) movement of female adjuster 31 is permitted. However, inclined surfaces of threads 45 engaging male adjuster 30 cause male adjuster 30 to move vertically due to rotational movement of female adjuster 31. Since bolt 28 is carried by male adjuster 30 and bolt 28 is threadably attached to punch tool 26 by threads 46. the height of the punch tool 26 can be adjusted. Because the rotation of female adjuster 31 is not restricted to increments, the height adjustment of punch tool 26 is infinite within the stroke permitted by threads 45.

Figure 7:
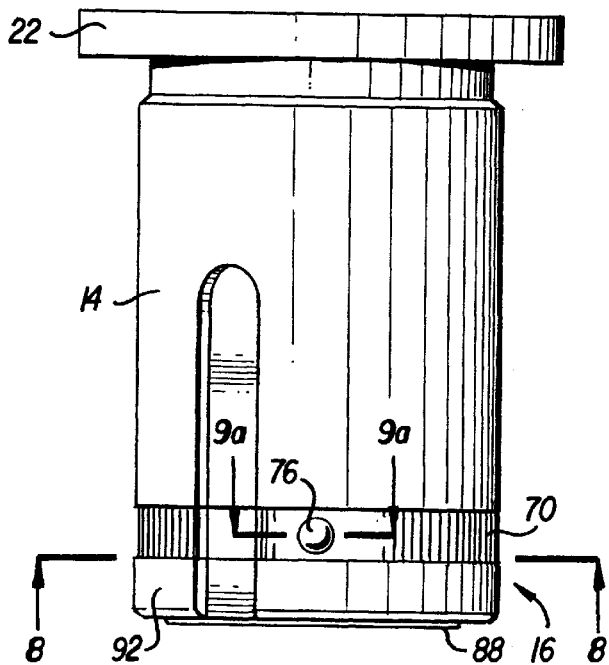
FIG. 7 is a side elevation view of the lower portion of the punch head assembly of the present invention.
Figure 9A:
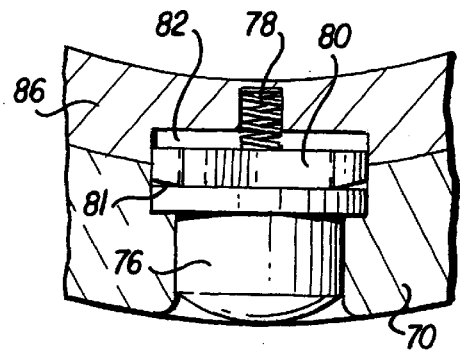
FIG. 9a is a partial fragmentary sectional view of a release button for a stripper plate quick release mechanism taken along line 8—8 of FIG. 7.
Figure 9B:
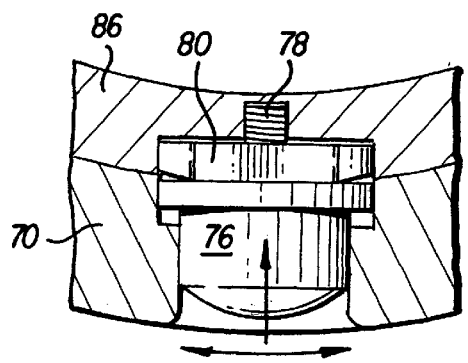
FIG. 9b is a partial fragmentary sectional view of the release button of FIG. 8 shown engaged in a release position.
Figure 8:
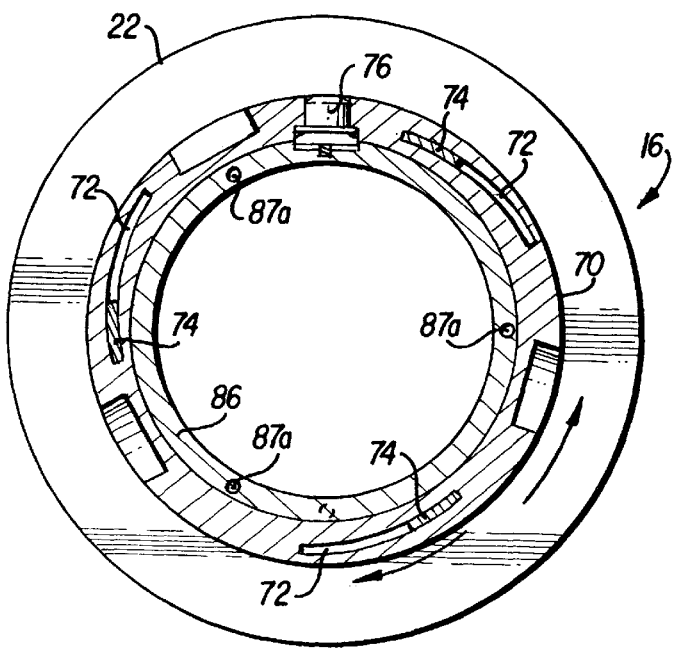
FIG. 8 is a sectional view of the stripper plate quick release mechanism taken along line 8—8 of FIG. 7.

FIG. 7 is a side elevation view of lower punch guide housing 14 and shows features directed to a stripper plate quick release mechanism 16. FIG. 8 shows a sectional view of the quick release mechanism 16. Engaging ring 70 is provided having arcuate grooves 72 of increasing radius which slide relative to clips 74 which are held fixed. A spring-biased lock button 76 is provided. Inner ring 86 is aligned with punch guide housing 14 by alignment dowels 87a which engage lifter springs 89 and lifters 91 (FIG. 3). Ring 86 is attached to punch guide housing 14 by retaining clip 93. The details of spring-biased lock button 76 are shown in FIGS. 9a and 9b. As shown, lock button 76 is made up of lock spring 78 and locking dog 80 having cam surface 81 which reside in indent space 82. As shown in FIG. 9b, when lock button 76 is pushed in, locking dog 80 compresses lock spring 78 and moves into indent space 82. This permits locking collar 70 to move circumferentially relative to inner ring 86. FIG. 10 shows the detail of how locking clip 74 is held in place by locking collar 70 and biased upwardly by stripper retainer 92. When lock button 76 is pressed in, locking collar or ring 70 is permitted to rotate. Arcuate cam surface 72 in locking collar 70 pushes locking clip 74 outwardly thus disengaging groove 87 of stripper plate 88 and stripper plate 88 is released, as shown in FIG. 11.

In operation, the stripper plate 88 is released by pushing in lock button 76 and then rotating locking collar or ring 70 thereby disengaging clips 74 from groove 87 on the outer periphery of the stripper plate 88. Stripper plate 88 drops away, exposing the working tip or end of punch tool 26. The end or tip can be sharpened, as appropriate, in place, or removed and sharpened and then replaced. Once sharpened, the punch tool 26 has a slightly reduced height as a result of the loss of material during the sharpening process. As a consequence, the height of the punch tool 26 is adjusted as described above.

Although certain presently preferred embodiments of the present invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A clutch mechanism for use in an adjustable height punch tool, the clutch mechanism comprising:

a pair of spring-biased ball bearings held apart by a spring disposed therebetween, said ball bearings pressed against an engaging surface when said ball bearings are biased apart by said spring, and a yoke having a pair of wedging surfaces, said wedging surfaces pressing said ball bearings together, and said ball bearings compressing said spring, when said yoke is pushed toward said pair of ball bearings thereby disengaging said ball bearings from said engaging surface;

wherein, when the yoke is pushed toward the pair of ball bearings, the yoke moves in a direction perpendicular to a portion of the engaging surface adjacent to the yoke.

2. A clutch mechanism as in claim 1, wherein:

the spring holds the pair of ball bearings apart in a first direction; and a distance between the wedging surfaces varies in a second direction which is different from the first direction.

3. A clutch mechanism as in claim 2, further comprising a second spring for biasing the yoke in the second direction away from the pair of ball bearings.

4. A clutch mechanism as in claim 3, wherein the yoke further comprises a trigger button, attached to the second spring, for being depressed to move the yoke toward the pair of ball bearings against a biasing force of the second spring.

5. A clutch mechanism as in claim 4, wherein the pair of ball bearings are held in a space defined by the engaging surface, the wedging surfaces and a contact surface.

6. A clutch mechanism as in claim 5, wherein the engaging surface is curved and the contact surface is flat.

7. A clutch mechanism as in claim 5, wherein, when the trigger button is depressed, the yoke is moved toward the contact surface.

8. A clutch mechanism as in claim 2, wherein each of the wedging surfaces is at a non-right angle relative to the first direction.

9. A clutch mechanism for use in an adjustable height punch tool, the clutch mechanism comprising:

a pair of spring-biased ball bearings held apart by a spring disposed therebetween, said ball bearings pressed against an engaging surface when said ball bearings are biased apart by said spring, and a yoke having a pair of wedging surfaces, said wedging surfaces pressing said ball bearings together, and said ball bearings compressing said spring, when said yoke is pushed toward said pair of ball bearings, thereby disengaging said ball bearings from said engaging surface; wherein:

the spring holds the pair of ball bearings apart in a first direction;

a distance between the wedging surfaces varies in a second direction which is different from the first direction;

the clutch mechanism further comprises a second spring for biasing the yoke in the second direction away from the pair of ball bearings;

the yoke further comprises a trigger button, attached to the second spring, for being depressed to move the yoke toward the pair of ball bearings against a biasing force of the second spring;

the pair of ball bearings are held in a space defined by the engaging surface, the wedging surfaces and a contact surface;

when the ball bearings are disengaged from the engaging surface, relative rotational motion between the engaging surface and the contact surface is allowed; and when the trigger button is depressed, the yoke is moved in a direction perpendicular to an axis of the relative rotational motion.

* * * * *